(12) United States Patent
Johnson et al.

(10) Patent No.: US 6,477,551 B1
(45) Date of Patent: Nov. 5, 2002

(54) INTERACTIVE ELECTRONIC MESSAGING SYSTEM

(75) Inventors: David E. Johnson, Cortlandt Manor; Frank J. Oles, Peekskill, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/249,797

(22) Filed: Feb. 16, 1999

(51) Int. Cl.7 .............................................. G06F 17/21
(52) U.S. Cl. ............................ 707/531; 707/5; 709/206
(58) Field of Search .............................. 707/4, 9, 531, 707/5; 709/206; 345/752; 706/45; 704/1

(56) References Cited

U.S. PATENT DOCUMENTS

| | | | |
|---|---|---|---|
| 5,187,735 A | * 2/1993 | Herrero Garcia et al. | 379/88 |
| 5,434,908 A | * 7/1995 | Klein | 379/88 |
| 5,459,717 A | * 10/1995 | Mullan et al. | 370/54 |
| 6,029,164 A | * 2/2000 | Birrell et al. | 707/3 |
| 6,088,696 A | * 7/2000 | Moon et al. | 707/10 |
| 6,161,130 A | * 12/2000 | Horvitz et al. | 707/5 |
| 6,182,066 B1 | * 1/2001 | Marques | 707/5 |
| 6,192,360 B1 | * 2/2001 | Dumais et al. | 707/6 |
| 6,256,630 B1 | * 7/2001 | Gilai et al. | 704/239 |
| 6,278,996 B1 | * 8/2001 | Richardson et al. | 707/6 |
| 6,394,263 B1 | * 5/2002 | McCrory | 704/1 |

* cited by examiner

Primary Examiner—Joseph H. Feild
(74) Attorney, Agent, or Firm—McGuireWoods LLP; Stephen C. Kaufman, Esq.

(57) ABSTRACT

A method and apparatus for interacting with incoming text information, e.g., a user query. The method of the present invention categorizes the incoming text information, and may also provide associated confidence levels with the categorization feature. The categorized information is used to query a database having associated category information with associated threshold values. The confidence levels may also be used when querying the database. The categorized information and corresponding confidence levels are then compared to the threshold value. If the categorized information and corresponding confidence levels equals or exceeds the threshold value then a response is provided by the system and method of the present invention. If the categorized information and corresponding confidence levels does not equal or exceed the threshold value then the system of the present invention will request further information of the user, and the method will repeat until (i) the categorized information and corresponding confidence levels equals or exceeds the threshold value or (ii) the system of the present invention times out.

30 Claims, 4 Drawing Sheets

INTERACTIVE ELECTRONIC MESSAGING SYSTEM

BACKGROUND OF THE INVENTION

1. Field of the Invention

The present invention generally relates to an electronic messaging system and, more particularly, to an interactive electronic messaging system that interacts with a requester (e.g., sender of an incoming electronic message) in order to generate an accurate and flexible response to an incoming electronic message.

2. Background Description

Electronic messages, commonly known as e-mail, are used extensively by businesses and institutions in the course of their ordinary commerce and activities. In many instances, these electronic messages are critical to the free flow of information between businesses (and individuals), and are used to more efficiently disseminate this information as well as conduct business over computer networks, whether it be intranets or the Internet.

These electronic messages are typically routed, via a mail system (e.g., server), to a specific individual or individuals for appropriate actions. However, in order to perform a certain action associated with the electronic message (i.e., forwarding the message to another individual, responding to the message or performing countless other actions, and the like), the individual must first retrieve and open the electronic message, and only then perform the appropriate action. This is both time consuming and inefficient from a system resource stand point.

It is desirable, however, to have an electronic mail system that effectively and efficiently performs actions associated with the electronic messages. This would be preferably performed without a qualified specialist or other individual first having to open, read and route the incoming message.

To this end, there are currently a number of systems that analyze and categorize free-form or semi-structured electronic messages from customers for the purpose of sending automatic responses, routing the inquiry to the proper department or individual for reply or supporting other business functions. However, these systems only handle very general inquires, and send only highly formulaic and general replies.

These typical "auto-response" or "auto-routing systems" have a pipeline architecture in which an incoming message is analyzed and categorized to determine an action. However, these systems are not very accurate, nor do they have much flexibility. That is, and more specifically, these systems do not have any mechanisms to (i) verify the system's understanding of the request or (ii) interact with the requester to secure additional information that might be needed to generate an accurate, personalized auto-response or to route the message to the proper individual or department for an appropriate response to the incoming electronic message.

At the current time, considerable effort is being made to develop knowledge based or expert systems for use in interactive electronic messaging systems. These efforts include providing an interactive system that is flexible, and yet provides accurate responses to incoming messages (e.g., performs appropriate actions associated with the incoming electronic message).

SUMMARY OF THE INVENTION

It is therefore an object of the present invention to provide an electronic messaging system that interacts with a requester (e.g., user of an electronic message) in order to provide an accurate and flexible response to the user's query.

In general, the present invention discloses a system and method for responding to an electronic message by interacting with a user or sender of the electronic message. Specifically, a user inputs text information into the system of the present invention (via email or other electronic means). The text information is then analyzed and assigned to zero or more categories and, in embodiments, associated confidence levels. The category and confidence level information is input to an action selector module which uses this category and, in embodiments, confidence level information, to query a structured database.

The structured database includes static category information where preferably each category includes an associated threshold level or value. The threshold value is a predetermined value which may be different for each static category information stored in the database.

The categories and, in embodiments, associated confidence levels are then compared to the threshold value(s) associated with the static category information of the database. If the categories and, in embodiments, associated confidence levels equal or exceed the threshold value(s), the present invention responds to the user's query, via an action module.

However, if the categories and, in embodiments, associated confidence levels do not equal or exceed the threshold value(s), the present invention prompts the user for more information, via free form or structured text information. The present invention then analyzes and categorizes the new text information, in combination with the previous text information or other information stored in a database associated with the present user. The action module then queries the structured database in order to obtain more specific static category information that is associated with one or more threshold values. When the categories and, in embodiments, associated confidence levels meets or equals the new threshold value, the system of the present invention then provides a final response to the user's query, with a high degree of confidence.

An apparatus for practicing the method of using the present invention is also described herein.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
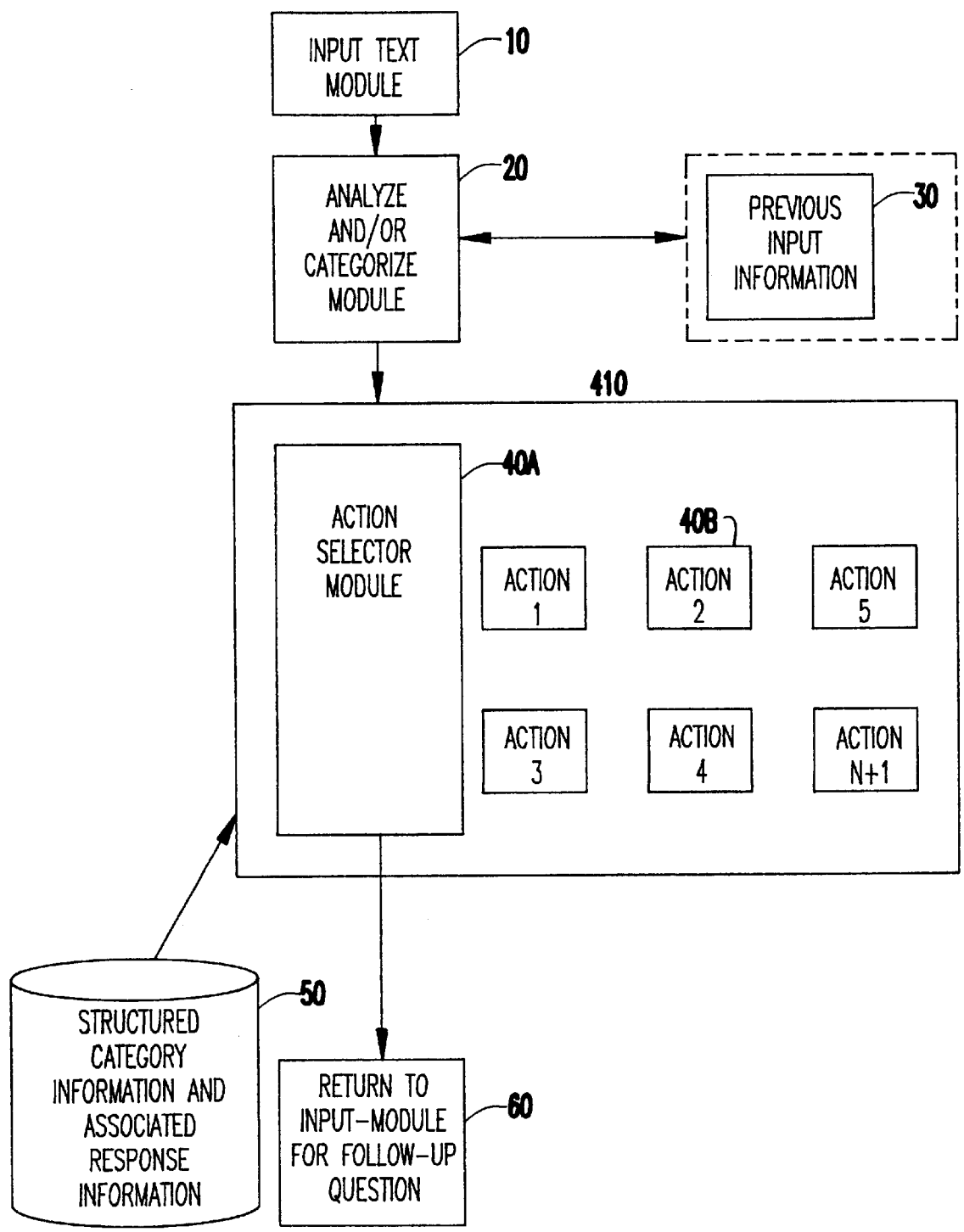
FIG. 1 is a block diagram of a general layout of the interactive electronic messaging system of the present invention.

The present invention is directed to an interactive electronic messaging system, and more specifically, a system and method for interacting with a requester (e.g., user or sender of incoming electronic message) in order to perform an appropriate action in response to the input text information of the electronic message. The interactive electronic messaging system of the present invention obviates using step-by-step point-and click menu navigation, which, although the state-of-the-practice in web interfaces, is tedious and rigid and often highly frustrating to users. Also, the present method and system is highly accurate as well as user-friendly without incurring any development/maintenance penalty.

Overview of the Interactive Electronic Messaging System

In preferred embodiments, the interactive electronic messaging system of the present invention provides for constrained or guided interaction with the user to clarify a specific intent of the user's initial electronic input (e.g., request). The interaction solicits more information from the user in the form of asking the user to (i) select from a list of choices of categories (typically organized in a hierarchy) and/or (ii) add additional free-text description of the user's request. In this manner, the system and method of the present invention provides for a high degree of accuracy and flexibility.

In order to accomplish the objectives of the present invention, the solicited information of both (i) and (ii) may be used by an interactive hierarchical categorizer to better refine the system's response to a specific request solicited by the user (e.g., the intent of the user). By placing a small burden on the user to clarify his/her request, the system and method of the present invention can verify its understanding of the request; that is, better clarify the specific intent of the user's request which provides for better accuracy when responding to the incoming electronic message.

The present system and method also provides a universal categorization engine that may be developed using the same basic machine-learning methods used for non-interactive systems, namely, sample labeled training data. The universal categorization engine drives the interaction in a highly constrained way, and the soliciting of free-form information (from the user) allows the necessary flexibility to allow the user to elaborate or correct any incorrect assumptions the system has made at a given point of the interaction. By constraining the interactions by evaluating the current understanding of a request in terms of its position in a hierarchically organized category representation of the information the system understands, the interactions are reduced in number and kind sufficiently to make the system of the present invention practical, i.e., straightforward to develop and maintain, while avoiding many of the problems of open-ended natural language understanding systems.

It is important to understand that the system and method of the present invention may engage in a natural language dialog, but does not suffer from the problems plaguing natural language understanding systems (or natural language dialog systems), e.g., difficulty developing and maintaining such systems or the necessity of supplying complicated, highly structured data as input to the development process or relying on experts to develop the systems by hand.

Accordingly, the system and method of the present invention is not a real natural language understanding system, but rather a sophisticated, hierarchical categorization system in which different categories in the hierarchy are associated with pre-defined actions.

It is well understood that the system and method of the present invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used as a controller with the invention.

Block Diagram of the Interactive Electronic Messaging System

Referring now to the drawings, and more particularly to FIG. 1, there is shown a block diagram of the present invention. Specifically, the system of the present invention includes an input text module 10 which allows a user to input free-form text information, or to further input structured or semi-structured text information into the system of the present invention. The structured or semi-structured text information may simply be, for example, a series of questions presented to the user in which a "yes" or "no" response is required, or a template which solicits specific answers of the user and which is commonly known by one of ordinary skill in the art.

In order to generate a response to the text information, the system of the present invention analyzes and categorizes the text information in the analyze and categorize module 20. In preferred embodiments, the analyze and categorize module 20 not only provides category information, but also provides confidence levels for the categories assigned to the text information. In further embodiments, the analyze and categorize module 20 may include linguistic pattern matching used in natural language modules. The analyze and categorize module 20 is discussed below in greater detail.

In addition to the free-form or structured text information, previous input text information, associated with the current user and stored in a previous input information module 30 (e.g., database), may also be simultaneously input to the analyze and categorize module 20. The addition of the previous input text information allows the analyze and categorize module 20 to analyze more information about the user in order to better refine, evaluate and categorize the input text information, and thus to better formulate a response to the user's input text information (e.g., query).

It is well understood that the input information module 30 is not critical to the understanding of the present invention, but is provided herein as a further working embodiment of the present invention. It is also important to note that the previous input information may be information obtained and stored during the current session or during a previous session, and may be combined with the current text information in order to formulate an accurate and flexible response to the input text information. Also, the previous input information module 30 may store previous category and/or confidence level information obtained from the analyze and categorize module 20, or other user information obtained from other means well known to one of ordinary skill in the art.

Still referring to FIG. 1, a structured category database 50 and an action selector 40a are also provided. The structured category database 50 is a static database that stores pertinent information (e.g., static category information), in preferably a hierarchical data structure, where each static category includes an associated predetermined threshold value. The structured category database 50 is queried by the action selector 40*a* such that the action selector 40*a* obtains pertinent and/or associated information (e.g., static category information) from the structured category database 50 in order to formulate an appropriate and accurate response to the input text information.

More specifically, in order for the system of the present invention to work in its intended manner, the action selector 40*a* captures category information, and preferably confidence level information, from the analyze and categorize module 20, and queries the structured category database 50 using the captured category and confidence level information. At this time, the category database 50 responds to the action selector 40*a* by:

(i) requesting further information because no nodes of information stored within the category database 50 correspond to the category (e.g., unclassified request); or (ii) providing information (associated with a node and stored within the category database 50) to the action selector 40*a* corresponding to the captured category and confidence level information. Such information includes associated threshold values.

Subsequent to the category database 50 providing corresponding information to the action selector 40*a*, the action selector 40*a* determines whether the category information and preferably confidence level information equals or exceeds the threshold value (associated with the static category information retrieved by the category database 50). In embodiments, if the category information and preferably confidence level information equals or exceeds the threshold value, one of the action modules 40*b* provides a final answer. The threshold value is preferably a value that is predetermined prior to querying the category database 50 and may be different for each static category information stored within the category database 50, depending on the preset predetermined values thereof.

However, the action selector 40*a* may provide other actions, via the action modules 40*b*, in response to the information obtained from the category database 50. These actions may additionally be, for example, (i) a request to verify the category, (ii) a request to choose a category from a preselected list, (iii) a request to provide more free-form or structure (or semi-structured) text input and the like. In addition, the action modules 40*b* may also route the input text information to a specialist. In this latter action, the action modules 40*b* routes the input text information to a specialist when the system of the present invention "times-out" (e.g., the system of the present invention determines that it does not understand the request of the user after requesting further information from the user). In preferred embodiments, these above actions (e.g., actions (i)–(iii) and "timing-out") are provided when the information obtained from the structured category database 50 does not equal or exceed the set threshold value.

FIG. 1 also includes a return to input text module 60. Thus, when the threshold value is not met or exceeded, for example, the return to input text module 60 may provide, for example, actions (i)–(iii) to the input text module so that the user can refine and/or add more text information to the system of the present invention.

General Category Hierarchy of the Category Database

Figure 2:
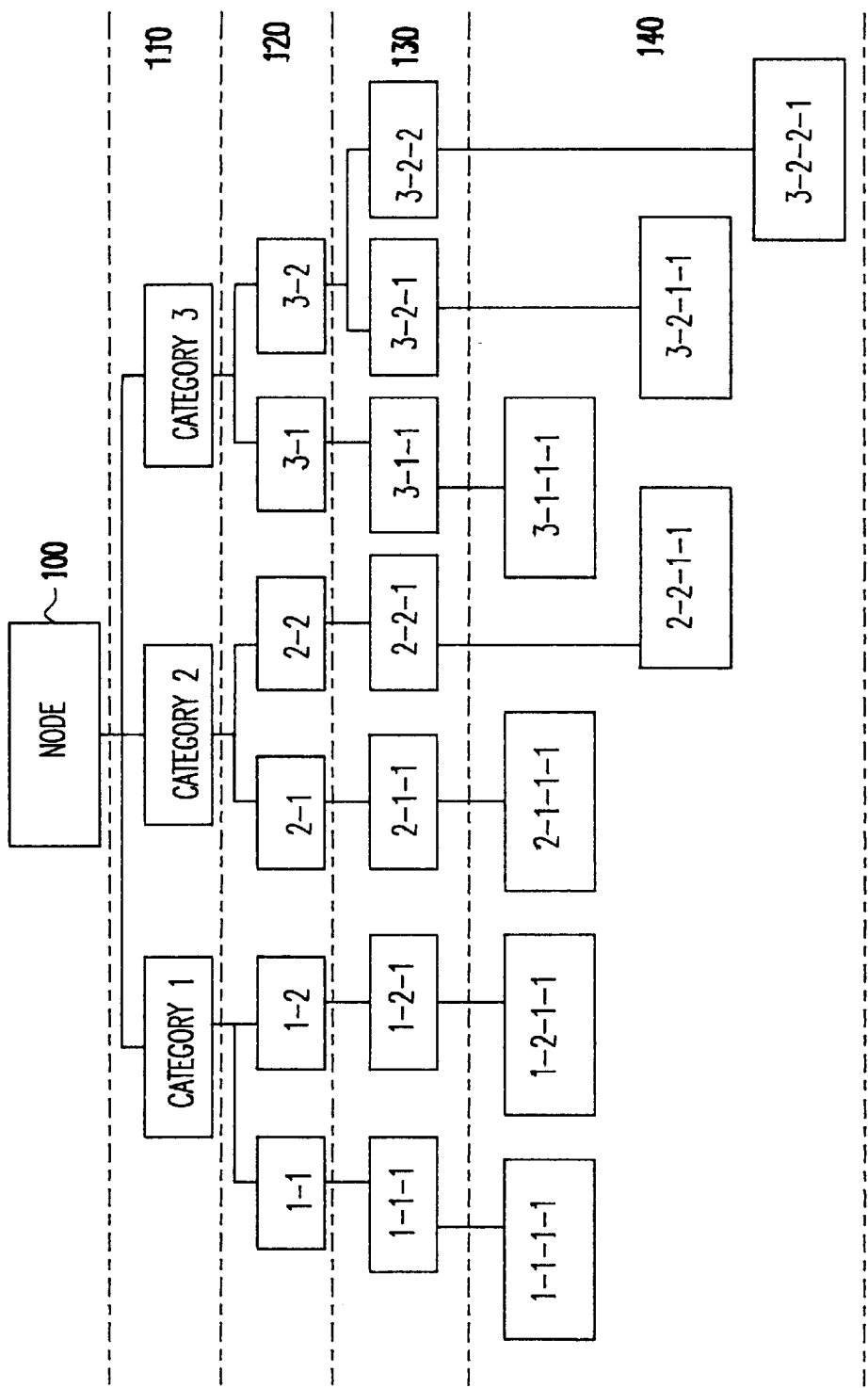
FIG. 2 shows an example of a general category hierarchy of the category database.

FIG. 2 shows an example of a general category hierarchy of the category database 50. It is well understood that FIG. 2 is only an illustrative example of the hierarchy of the category database 50 and that more or less levels, or more detailed or high level information may be provided in the category database 50 of the present invention, while still interfacing in its intended manner with the action selector 40*a*. In preferred embodiments, category database is static and contains hierarchical structured category information having associated threshold values where the category information may concern any number of subjects, such as, for example, investment information, business planning and the like. Similarly, the In the example of FIG. 2, the category database 50 includes five node levels 100, 110, 120, 130, 140 (where each node may have an associated threshold value). Level 100 is the top or most general node level of the category database 50 and includes three categories containing general information. Level 140 is the most specific node level of the category database 50 and includes seven categories containing more specific information. The remaining levels 110, 120, 130 are node levels containing information of increasing specificity, respectively. The object of the present invention, of course, is thus to retrieve the most specific node information possible in order to most accurately respond to the initial input text information.

Referring to FIG. 2, and with reference to FIG. 1, the user inputs text information which is analyzed and/or categorized in the analyze and categorize module 20. The action selector 40*a* then queries the category database 50 using this analyzed and/or categorized information in order to obtain certain corresponding information (i.e., information associated with a certain node in the category database 50). The information retrieved from the structured category database 50 is then evaluated to determine if it equals or exceeds a set threshold value and, if yes, is used to formulate a response to the input text information.

Still referring to FIG. 2, if the retrieved information is associated with a node on the most general level 100, the action module 40*b* may request further information from the user via free form or structured (or semi-structured) text information in order to more accurately respond to the text information. This further input text information may then be analyzed and/or categorized and provided to the action selector 40*a*. In preferred embodiments, the further input text information is analyzed and categorized in combination with the previous input text information. The action selector 40*a* then queries the category database 50 using the analyzed and/or categorized information in order to obtain more accurate information associated with a node in a more specific node level corresponding to the analyzed and/or categorized information, such as, for example, information associated with node 1-1-1-1 on node level 140. In this case, information associated with node 1-1-1-1 on node level 140 is the most specific information and would then be used to respond to the user, via one of the action modules 40*b*. In this manner, the system of the present invention interacts with the user in order to better understand the user's request and thus provide the most accurate information.

Specific Category Hierarchy of the Category Database

Figure 3:
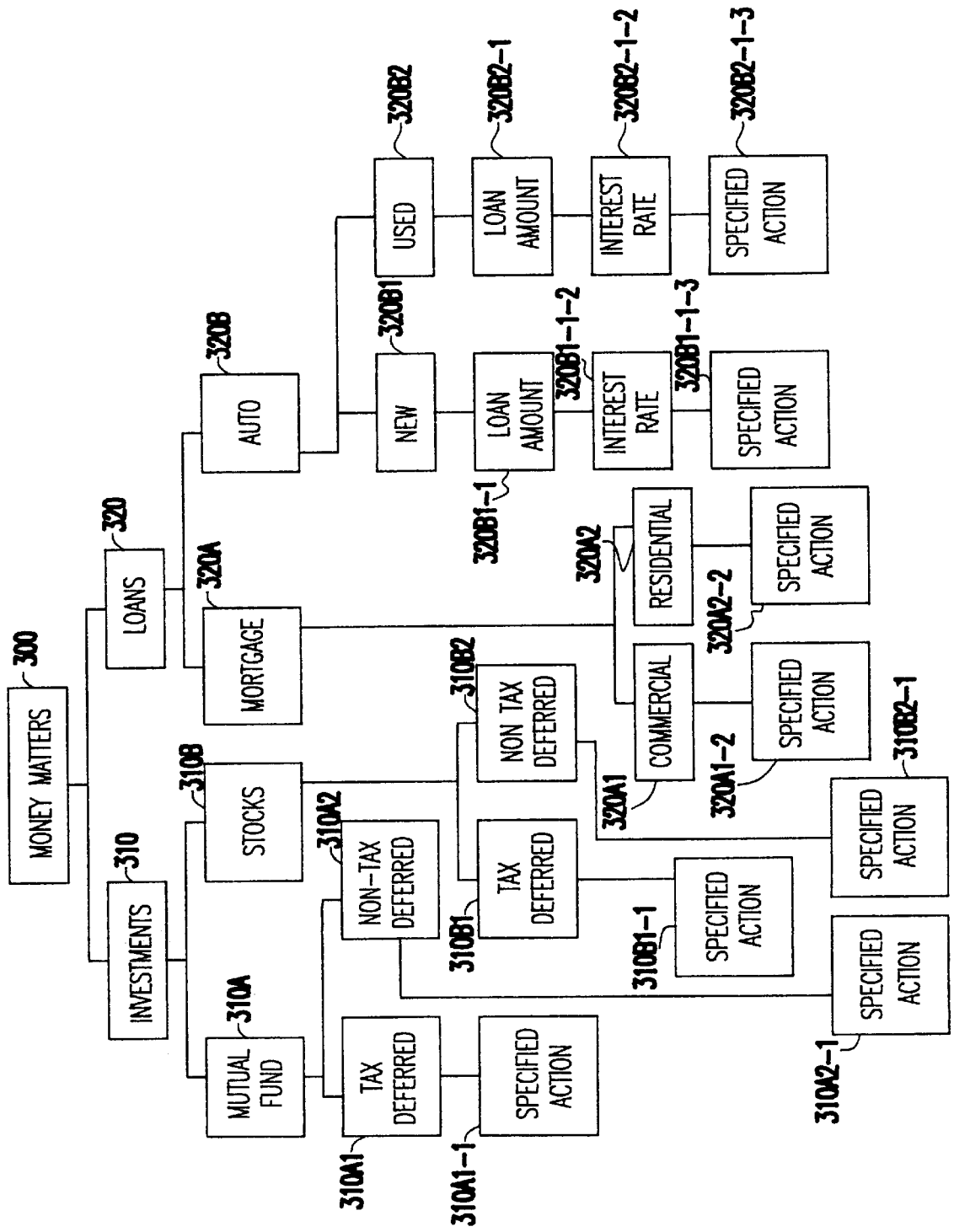
FIG. 3 is a flow diagram showing an example of a specific category hierarchy of the category database.

In a more specific example, FIG. 3 shows an example of a specific category hierarchy of the category database 50 having stored information associated with nodes 300 through 320*b*2-1-3. As clearly seen in the example of FIG. 3, each category does not terminate in the same node level. For example, there are five node levels in one branch originating from node "loans" 320 (e.g., (i) node "auto" 320b, (ii) node "new" 320b1, (iii) node "loan amount" 320b1-1, (iv) node "interest rate" 320b1-1-2 and (v) node "specified action" 320b1-1-3) while three node levels originate from another branch of the node "loans" 320 (e.g., node "mortgage" 320a, (ii) node "residential" 320a2 and (iii) node "specified action" 320a2-2).

Using the example of FIG. 3 for illustrative purposes, the user queries the system about "money matters" and more specifically about "new auto loans". This input text information is analyzed and/or categorized in the analyze and categorize module 20. The action selector 40a then queries the category database 50 and obtains corresponding information associated with node 320b1 or lower, for example, "interest rate" information in node 320b1-1-2. The information retrieved from the category database 50 is then evaluated by the action selector 40a to determine if it equals or exceeds a set threshold value. If it does, then the system of the present invention responds to the input text information, via a action module 40b. However, if the corresponding information does not equal or exceed the set threshold value, the action module 40b may request further information from the user via free form or structured (or semi-structured) text information in order to more accurately respond to the text information. This further input text information may, for example, be "loan amount".

In preferred embodiments, the "loan amount" text information is analyzed and categorized in combination with the previous input text information, and the action selector again queries the category database 50 using the analyzed and/or categorized information in order to obtain more accurate information. In this case, information associated with node 320b1-1-2 or even more specific information associated with node 320b1-1-3 may be retrieved in order to respond to the user, via one of the action modules 40b. In this manner, the system of the present invention interacts with the user in order to better understand the user's request and thus provide the most accurate information.

Method of Use

Figure 4:
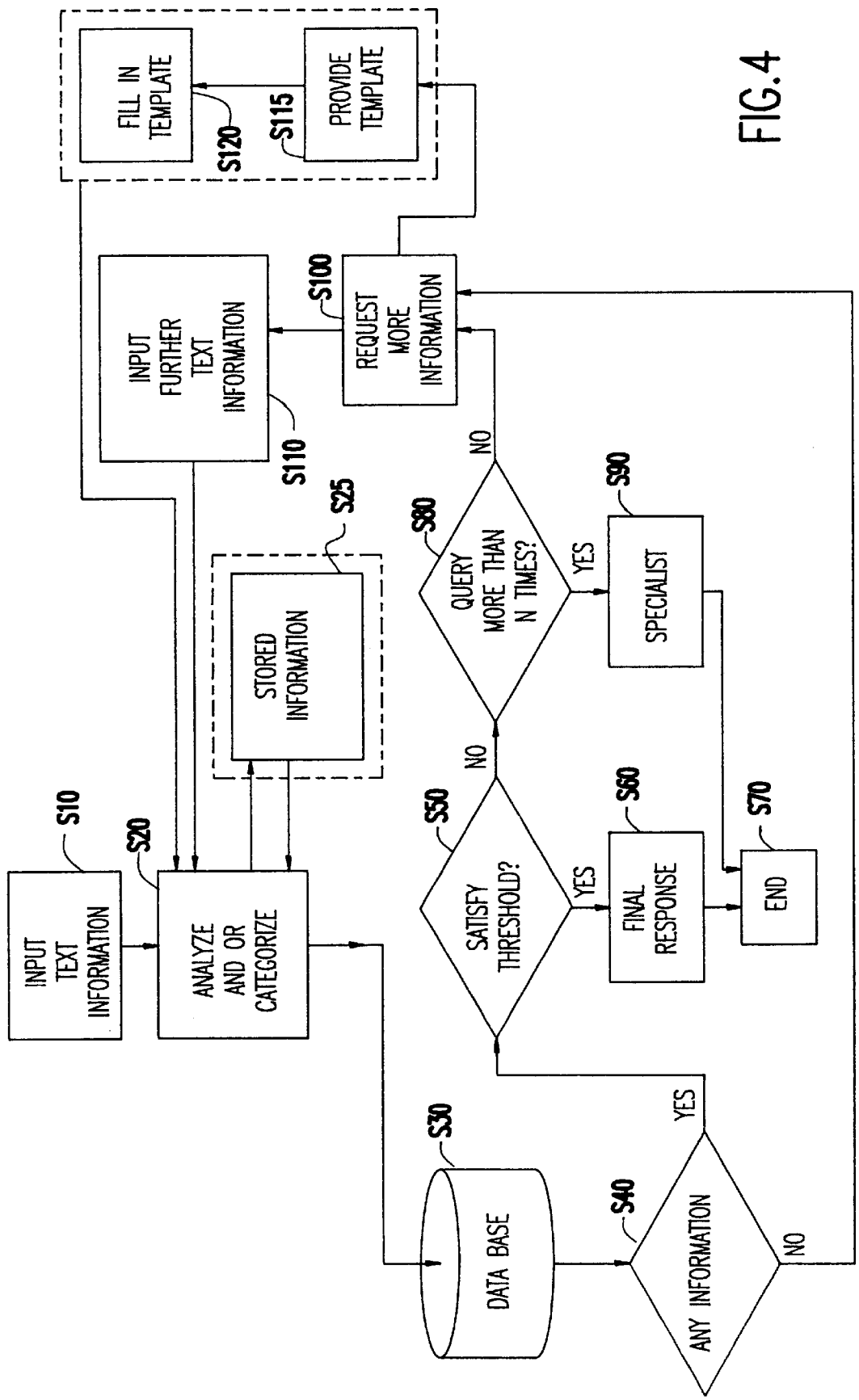
FIG. 4 is a flow diagram showing a method of the present invention.

Referring now to FIG. 4, a flowchart showing a method of the present invention is provided. At step S10, a user inputs free-form text information, or structured or semi-structured text information. At step S20, the user input text information is analyzed in order to provide category information (e.g., categorization information) and, in embodiments, confidence levels. At step S30, a database is queried in order to determine whether any information associated with the categorization information is stored within the database. At step S40, a decision is made as to whether any information (e.g., stored static category information) stored in the database 50 corresponds to the categorization information (e.g., whether the database contains any information that may be helpful in responding to the user's input text information).

At step S50, a decision is made as to whether the categorization information and confidence level information equal or exceed a threshold value associated with the stored static category information. If the categorization information (or, in embodiments, associated confidence level information) equals or exceeds the threshold value, then at step S60, a final response to the input text information is provided to the user. At step S70, the method of the present invention ends.

However, if the categorization information and/or confidence level information does not equal or exceed the threshold value, then at step S80, the method of the present invention determines whether there were more than N (where N is an integer greater than or equal to 0) requests for more user information (or whether the user provided further text information to the system more than N times in response to such request). If there were more than N requests, then the method of the present invention "times-out", and the input text information is forwarded to a specialist or other person, at step S90. At this point the specialist provides an appropriate response to the user's requested information. At step S70, the method of the present invention ends.

At step S100, the method of the present invention requests further input text information if (i) N requests were not exceeded or (ii) there was no corresponding category information in the database (as determined in step S40). At step S110, the user provides further input text information which is again analyzed at step S20. At this point, the previous input text information stored at step S25 in combination with the further text information input (at step S110) may be analyzed together in order to provide categorization information and, in embodiments, associated confidence levels. The method of the present invention then follows the remaining steps, as detailed above.

In embodiments, at step S115, the method of the present invention provides a template for the user. At step S120, the user provides further input text information as structured or semi-structured text information. Similar to the information provided in step S110, the information may be analyzed together with the previous input text information stored at step S25 in order to provide categorization information and, in embodiments, associated confidence levels. The method of the present invention then the follows the remaining steps, as detailed above.

Analyze and Categorize Module

As previously discussed, the analyze and categorize module provides category and confidence level information. In order to generate category information associated with the input text information, tokenization, morphological analysis, syntactic parsing, statistical analysis, or other feature selection functions well known in the art, are performed on the input text information.

Also, in order to generate confidence levels associated with the input text information, classifier rules must first be obtained. For example, the development of a classifier for the input text information typically involves three major tasks including data preparation, training and testing. Data preparation involves obtaining a corpus of pre-classified data and training involves training a classifier on a corpus of pre-classified data. Testing includes testing the classifier with some subset of the pre-classified data set aside for this purpose.

More specifically, training data may include generating training vectors. In a perfecting feature of the present invention, generating training vectors may be divided into three steps:

1. Feature definition: Typically this involves breaking the text up into tokens. Tokens can then be reduced to their stems or combined to multi-word terms.
2. Feature count: Typically this involves counting the frequencies of tokens in the input texts. Tokens can be counted by their absolute frequency, and several relative frequencies (relativized to the document length, the most frequent token, square root, etc.).
3. Feature selection: This step includes weighting features (e.g., depending on the part of the input text they occur in: title vs. body), filtering features depending on how distinctive they are for texts of a certain class (filtering can be done by stop word list, based on in-class vs. out-class frequency etc.).

More specifically, and in embodiments, the method and system of the present invention trains on incoming documents (e.g., raw data) by breaking the text of the document into tokens, which can then be reduced to their stems or combined to multi-word terms. These features may be weighted (e.g., depending on the part of the input text they occur in: title vs. body) and may also be filtered depending on how distinctive they are for texts of a certain class. Filtering features may include, for example, a stop word list (e.g., filtering out unwanted words/terms), or word frequency or category filtering (absolute/relative, threshold/in-class out-class). Filtering by frequency allows the user to specify the minimum number of examples (documents) of a category that must be present in the document collection. Filtering by category allows the user to specify a list of categories to be removed (or kept) in the training data.

Further, the method and system of the present invention may also merge all features from different sections of the input text into one feature (as an intermediate output, this results in a feature value table). Class label(s) and tokenization of the training data may also be provided, and stemming, abbreviation expansion, names or term extraction etc., may further be used to define the used features.

The extracted data is then provided in a vector format, such as a feature count table and further reduced, if desired. The values of the feature vector may be in binary or numerical form, and may be provided in a simpler vector format (e.g., reduced) in order to use less disk space. The simple vector format may be provided in a feature count table with one column for each defined feature (features occurring in different sections of the input are counted separately) and one line for each input document. The feature count table may contain several different counts for the feature (absolute count plus several relative counts), and is designed to be as information rich as possible so that various training runs using different counting, weighting or filtering strategies do not have to revisit the input text. The output of this feature is a table with vectors suitable as input for a chosen machine learning program.

The vector data may then be submitted to a machine learning module (not shown) where an algorithm is applied to the data. Alternatively, the classification rule may be derived by manual analysis, manual modification of machine generated rules or a combination of the above. Testing provides a precision, recall, accuracy or other statistic analysis of the tested data. The output of the learning module is a set of classification rules.

The confidence levels are determined from the training data by applying the classification rules to the training data, where each document in the training data has a known set of class labels. The class labels determine for each rule the relative frequency with which the rule is correctly applied. The relative frequency for each rule is the confidence level for that rule, for example, a number between 1 and 100. One way to assign a confidence level for a given class to a document is by assigning to a document the highest confidence level of any rule that applies assigning the document to that class.

Co-pending U.S. patent application Ser. No. 09/176,322 filed on Oct. 22, 1998 is hereby incorporated by reference in its entirety. U.S. patent application Ser. No. 09/176,322 further provides a detailed analysis of confidence levels as well as other text classification techniques.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method of interactively generating a response to an incoming electronic message, comprising:
   analyzing text information of the incoming electronic message to categorize the incoming text information into categorization information, the text information being a user input query;
   retrieving category information from a data storage unit corresponding to the categorization information, the retrieved category information having an associated threshold value which is a predetermined value;
   determining whether the categorization information equals or exceeds the threshold value associated with the retrieved category information; and
   requesting further text information from the user when the categorization information does not equal or exceed the threshold value, wherein the request for further text information is machine generated.

2. The method of claim 1, further comprising:
   providing the further text information in response to the requesting step, the further text information being analyzed with the text information to categorize the further text information and the text information into the categorization information; and
   repeating the retrieving and determining steps.

3. The method of claim 2, further comprising responding to the input user query when the categorization information equals or exceeds the threshold value, the response being associated with the retrieved category information.

4. The method of claim 1, further comprising responding to the input user query when the categorization information equals or exceeds the threshold value, the response being associated with the retrieved category information.

5. The method of claim 1, wherein the text information is user input free-form text information, or structured or semi-structured text information.

6. The method of claim 1, wherein the analyzing step further comprises providing confidence level information associated with the categorization information, the confidence level information and the categorization information being used in the determining step, the confidence level information being derived by:
   training on the text information by breaking the text information into tokens and counting the frequencies of the tokens;
   providing a statistical analysis of the text information in order to provide a set of classification rules, and
   applying the classification rules to the training data, where each document associated with the text information in the training data includes a known set of class labels.

7. The method of claim 6, wherein the training on the text information further includes morphological analysis, syntactic parsing, or statistical analysis.

8. The method of claim 1, wherein the requesting step requests further text information from the user when the user has not provided the further text information more than N times, where N is an integer, the further text information being analyzed with the text information to categorize the further text information and the text information into the categorization information.

9. The method of claim 8, further comprising providing the user with a template for providing structured or semi structured text in response to the requesting step.

10. The method of claim 1, further comprising providing the user with a template for providing structured or semi structured text in response to the requesting step.

11. The method of claim 1, further comprising timing out when the categorization information does not equal or exceed the threshold value and when the user has provided further text information more than N times, where N is an integer.

12. The method of claim 1, further comprising requesting further text information from the user when there is no retrieved category information stored within the data storage unit associated with the categorization information.

13. The method of claim 1, further comprising storing user information in a second storage unit, the stored user information being analyzed with the text information to categorize the stored user information and the incoming text information into the categorization information.

14. The method of claim 13, further comprising repeating the steps of claim 1 until the categorization information equals or exceeds the threshold value such that when the categorization information equals or exceeds the threshold value a machine generated response is provided to the user.

15. An article of manufacture comprising:
   a computer usable medium having computer readable program code means embodied therein for analyzing text information of incoming electronic message to categorize the incoming text information into categorization information, the text information being a user input query;
   a computer usable medium having computer readable program code means embodied therein for retrieving category information from a data storage unit corresponding to the categorization information, the retrieved category information having an associated threshold value which is a predetermined value;
   a computer usable medium having computer readable program code means embodied therein for determining whether the categorization information equals or exceeds a threshold value associated with the retrieved category information; and
   a computer usable medium having computer readable program code means embodied therein for requesting further text information from the user when the categorization information does not equal or exceed the threshold value, wherein the request for further information is machine generated.

16. The article of manufacture of claim 15, further comprising:
   a computer usable medium having computer readable program code means embodied therein for providing the further text information in response to the generating step, the further text information being analyzed with the text information to categorize the incoming text information and the further text information into the categorization information; and
   a computer usable medium having computer readable program code means embodied therein for responding to the input user query when the categorization information equals or exceeds the threshold value, the response being associated with the retrieved category information.

17. A means for interactively generating a response to an incoming electronic message, comprising:
   means for analyzing text information of the incoming electronic message to categorize the incoming text information into categorization information, the text information being a user input query;
   means for retrieving category information from a data storage unit corresponding to the categorization information, the retrieved category information having predetermined associated threshold values;
   means for determining whether the categorization information equals or exceeds a threshold value; and
   means for requesting further text information from the user when the categorization information does not equal or exceed the threshold value, wherein the request for further information is machine generated.

18. The means of claim 17, further comprising means for responding to the input user query when the categorization information equals or exceeds the threshold value, the response being associated with the retrieved category information.

19. The means of claim 17, wherein the means for analyzing further comprises means for providing confidence level information associated with the categorization information, the confidence level information being derived from:
   means for training on the text information by breaking the text information into tokens and counting the frequencies of the tokens;
   means for providing a statistical analysis of the text information to provide a set of classification rules, and
   means for applying the classification rules to the training data.

20. The means of claim 18, wherein the means for requesting further text information from the user requests information from the user when the user has not provided further text information more than N times, where N is an integer.

21. The means of claim 17, further comprising means for timing out when the categorization information does not equal or exceed the threshold value and when the user has provided further text information more than N times, where N is an integer.

22. The means of claim 17, wherein means for requesting further text information from the user includes requesting the further text information when there is no retrieved category information stored within the data storage unit associated with the categorization information.

23. The means of claim 17, further comprising means for storing user information, the stored user information being analyzed with the text information of the incoming electronic message to categorize the user information and the incoming text information into the categorization information.

24. An apparatus that interactively generates a response to an incoming electronic message, comprising:
   an analyzing module, the analyzing module categorizing the incoming text information into categorization information, the text information being a user input query;
   a storing module associated with the analyzing module, the storing module being a database that stores category information corresponding to the categorization information obtained from the analyzing module;
   a retrieving and determining module associated with the storing module, the retrieving and determining module retrieves the category information corresponding to the categorization information and determines whether the categorization information equals or exceeds a threshold value, the threshold value being a predetermined value associated with the stored category information; and
   a requesting module associated with the retrieving and determining module, the requesting module requesting further text information from the user when the categorization information does not equal or exceed the threshold value, wherein the request for further information is machine generated.

25. The apparatus of claim 24, further comprising a responding module, the responding module responds to the input user query when the categorization information equals or exceeds the threshold value, the response being associated with the retrieved category information.

26. The apparatus of claim 24, wherein the analyzing module further provides confidence level information associated with the categorization information, the confidence level information being used in the retrieving and determining module with the categorization information, the confidence level information being derived from:
- a training module training on the text information by breaking the text information into tokens and counting the frequencies of the tokens;
- a statistical analysis module that provides a set of classification rules, and
- means for applying the classification rules obtained from the statistical analysis module to the training data obtained from the training module.

27. The apparatus of claim 24, wherein the requesting module requests information from the user when the user has not provided further text information more than N times, where N is an integer.

28. The apparatus of claim 24, further comprising a timing out module for timing out when the categorization information of the analyzing module does not equal or exceed the threshold value and when the user has provided further text information more than N times, where N is an integer.

29. The apparatus of claim 24, wherein the requesting module requests the further text information when there is no retrieved category information stored within the storing module associated with the categorization information.

30. The apparatus of claim 24, further comprising a second storing module that stores user information and being associated with the analyzing module, the stored user information being analyzed in the analyzing module with the text information to categorize the stored user information and the incoming text information into the categorization information.

* * * * *